United States Patent [19]

Tatsunosuke

[11] 4,435,076
[45] Mar. 6, 1984

[54] PROJECTED IMAGE POSITIONING METHOD AND APPARATUS FOR PHOTOGRAPHIC ENLARGER

[75] Inventor: Masuda Tatsunosuke, Kyoto, Japan

[73] Assignee: Dainippon Screen Mfg. Co., Ltd., Japan

[21] Appl. No.: 390,674

[22] Filed: Jun. 21, 1982

Related U.S. Application Data

[63] Continuation of Ser. No. 142,220, Apr. 21, 1980, abandoned.

[30] Foreign Application Priority Data

May 10, 1979 [JP] Japan .................... 54-58305

[51] Int. Cl.³ .............................. G03B 27/52
[52] U.S. Cl. ......................... 355/41; 355/68; 355/77
[58] Field of Search .................... 355/41, 77, 68

[56] References Cited

U.S. PATENT DOCUMENTS 4,018,526  4/1977  Schroter .................... 355/68

FOREIGN PATENT DOCUMENTS 1622225  10/1970  Fed. Rep. of Germany .
2506628   9/1975  Fed. Rep. of Germany .

Primary Examiner—Monroe H. Hayes
Attorney, Agent, or Firm—Brumbaugh, Graves, Donohue & Raymond

[57] ABSTRACT

A method and an apparatus to control the position of a specific frame of a microfilm by an enlargement reproduction device on a sensitized material. A register mark provided outside the effective image area of the said frame is projected and enlarged on the said sensitized material surface or on a receiver element attached to a surface optically equivalent to the sensitized material surface, and the position of the said frame image on the said sensitized material is controlled by the detection signals from the said receiver element.

1 Claim, 6 Drawing Figures

PROJECTED IMAGE POSITIONING METHOD AND APPARATUS FOR PHOTOGRAPHIC ENLARGER

This is a continuation of application Ser. No. 142,220 filed Apr. 21, 1980, now abandoned.

BACKGROUND OF THE INVENTION

The present invention relates to the photographic enlarger to project a specific frame of a microfilm on a sensitized material for exposure and to print out the image in a desired size, and is concerned with the method and apparatus to position the said image on the holder to which the image is held so as the frame projection is positioned precisely and automatically on the said sensitized material surface. None of the automatic positioning methods practiced so far for enlarged projection of a specific frame image of microfilms on a sensitized material surface such as printing plates is precise enough to be used, for example, to color printing, for which a multiple number of discrete images in different colors are combined. Most of the images now reproduced as printed matters by enlarged projection on printing plates are in mono-color and low accuracy in positioning causes no problems. If the enlarging reproduction is applied to multi-color printings, however, low accuracy in positioning results in a deviation between the printed images on respective color printing plates, which in turn brings about unseemly color shears on the printed picture making it unuseful. That is to say, the conventional positioning method meets the requirements for mono-color printing but does not provide the accuracy required for the preparation of color printing plates.

One of the approaches to color printing is to detect a register mark provided outside the effective image area of a specific frame directly at the position of the microfilm and to locate the projected image at the specific position on the sensitized material surface.

This method, however, has a difficulty in positioning since a micro-sized register mark on the microfilm is detected directly, and has a disadvantage in that the error in positioning the projected image is also enlarged proportionally to the magnification.

For color printing, the required positioning accuracy on the sensitized material surface is on the order of 0.03 mm, which means the direct positioning accuracy of the register mark outside the effective area of a specific frame image must be 0.003 mm, if the magnification is 10 times, and such a degree of accuracy is rather hard to realize from a technical point of view.

SUMMARY OF THE INVENTION

In view of the disadvantage by the conventional method as described above, it is a general object of this invention to provide a method and apparatus for accurate positioning of a specific frame image of microfilms.

A feature of the present invention is that, in projecting a specific frame image of microfilms at a specific position on a sensitized material surface for exposure, a register mark outside the effective image area of the frame is projected and enlarged on the sensitized material surface or on a receiver element positioned on a surface optically equivalent to the sensitive material surface, and the position of the specific frame image on the sensitized material surface is controlled by the detection signals from the said receiver element. Another feature of the present invention is that the positioning device for the projected image by an enlarging reproduction is provided with a register mark outside the image area of a specific frame of microfilms, with a receiver element to detect the position of the said register mark on a sensitized material surface, and with an inching mechanism attached to the holder for the said microfilm to move the holder in its rotating direction or horizontally and vertically. The receiver element may also be placed on a surface optically equivalent to the sensitized material surface.

DETAILED DESCRIPTION OF THE PREFERRED EMBODIMENTS

Figure 1:
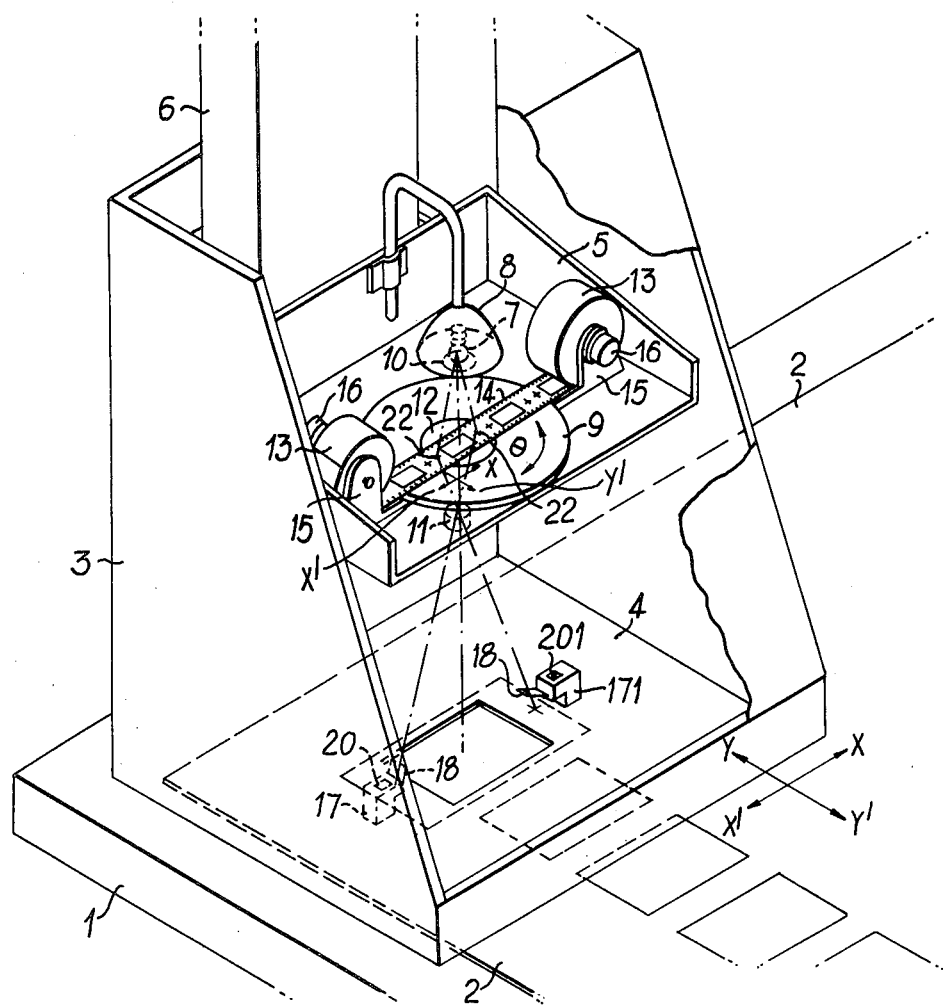
FIG. 1 is an oblique perspective drawing to show the exposure head of the photographic enlarger incorporating the principal part of the present invention.
Figure 2:
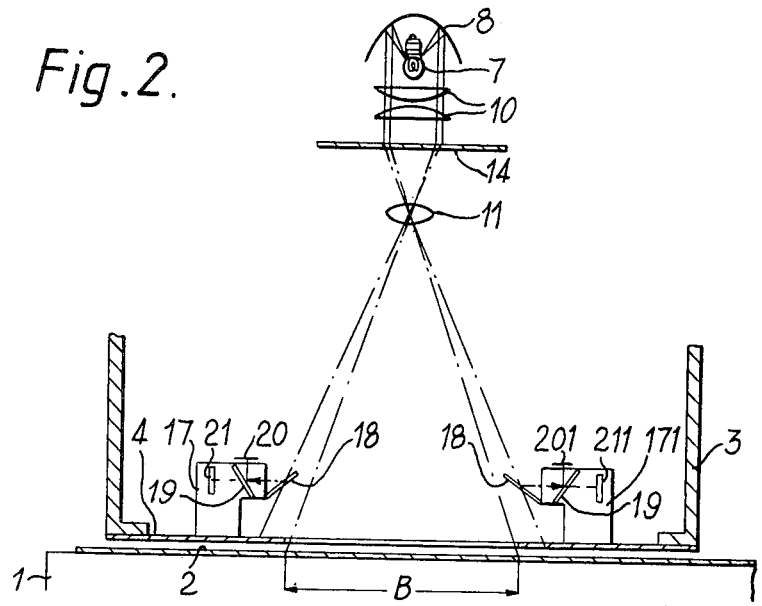
FIG. 2 is a schematic drawing of the principal part.

The detailed description of the present invention is now given referring to FIG. 1 and FIG. 2 showing an embodiment of this invention.

In the drawings, (1) is a plate holder fixed by supporting legs and frames (not illustrated), on which a sensitized material (2), such as printing plates, is held by taping or by vacuum or by both means. Reference numeral (3) denotes an exposure head carrier and is so arranged, though not illustrated, as to move along the rail in Y axis direction to guide the sensitized material (2) longitudinally and also along the rail in X axis direction to guide the sensitized material (2) transversely.

A driving mechanism composed of ball-screws is provided in the frame near the rails in X and Y axes directions, and is connected to a digital counter for length measurement.

Numeral (4) denotes a shade mask attached to the bottom of the exposure head carrier (3) apart from the sensitized material (2) by 2 mm, as an example. Provided at the central part of the shade mask is an opening (B) corresponding to the effective image area of the enlarged projection of the microfilm image.

Numeral (5) denotes an exposure head connected to a frame (6) which can move up and down freely so as to be fixed at any desired position. The exposure head (5) is composed of the same structure as that of a flat type step-and-repeat machine used also for color plate making, and the positioning accuracy to the sensitized material (2) is almost as high as that of the step-and-repeat machine.

Numeral (7) denotes a light source arranged in a reflector (8) supported by arms, and is so held as to enable adjustment of its distance to a plate holder (9).

Numeral (10) denotes a condenser lense, and (11) denotes a projection lense so arranged to move up and down along the optical axis under the plate holder (9).

A shutter is provided between the condenser lense (10) and the light source (7), although it is not shown in the drawings. The plate holder (9) is discal, and a light transmission plate (12) made of quartz glass is imbedded in its middle, flush with the surface. The plate holder (9) is connected to a 1st base (not shown) through the bearing to allow free rotation around its center. The said 1st base is connected to the 2nd (not shown) base so as to slide in the Y axis direction little by little within a very limited range, and the said 2nd base is connected, in turn, to the bottom of the exposure head (5) and is allowed to slide freely little by little within a very limited range in the X axial direction. Accordingly, the plate holder (9) is attached to the bottom of the exposure head (5) through the said 1st and 2nd bases so as to turn around the center and also to be fixed at a specified angle such as 90° or 180°, yet fine adjustment of motion in both the X and Y axes directions and of rotation at each fixed position are made possible.

Since the rotary driving mechanism of the plate holder (9) can be a known mechanism, such as for example, a worm wheel fixed to the plate holder (9) and a worm gear interlocked with the worm wheel and attached to the output shaft of a pulse motor which is fixed to the said 1st base, no illustration of the rotary driving mechanism is given.

As for the fine movement mechanism of the said 1st and 2nd bases respectively in Y axis or X axis direction, feed nuts respectively fixed to each base, and feed screws respectively connected to the output shaft of the pulse motor which is fixed at the 2nd base or at the bottom of the said exposure head (5), and interlocked with the feed nuts, may be used for example and are not illustrated since they are well known.

Moreover, the 1st and 2nd bases and also the said driving mechanisms are so arranged not to interrupt the projection light of the microfilm.

Numeral (13) designates a film magazine fixed to a support bracket (15) which is attached to the plate holder (9).

Numeral (16) designates a pulse motor mounted on the flange to drive the film reel in the film magazine (13).

Microfilm (14) is unreeled from the magazine (13) at one side and wound around the magzine (13) at the other side, is held parallel to the plate holder (9) with a slight clearance in-between, and is clamped to the plate holder (9) by an appropriate means when it is necessary, i.e. during projection and printing for example.

Numerals (17) and (171) denote sensors to detect a projected and enlarged image of the register mark and to position the image of the specific frame of the microfilm on the sensitized material (2). These are placed at the specified positions on the shade mask (4) symmetrically to the optical axis of the projection lense (11).

Figure 3:
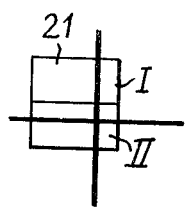
FIG. 3 to FIG. 6 are the explanatory drawings of the register mark projected and enlarged on a receiver element.
Figure 4:
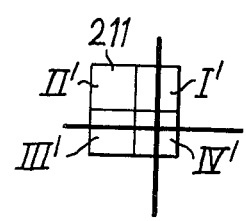

One each of half-mirrors (18)(19) are respectively attached to the outside and inside of the sensors (17)(171), and a small window with focusing glasses (20)(201) is provided at the upper part. The half-mirrors (18) may be a full reflection mirror. The pint glasses (20)(201) are with a datum line of a specific shape such as + or —. Numerals (21) and (211) denote receiver elements mounted in the respective sensors (17)(171) with the centers fitted to respective optical axes and placed at the positions that make the distance from the half mirrors (18) substantially equal to the distance to the sensitized material surface (2). These receiver elements are composed of at least two electrically independent divided elements. That is, for example, the receiver element (21) is divided into upper and lower sections as shown in FIG. 3, and the receiver element (211) is divided into upper, lower, left and right sections as shown in FIG. 4. Each one of these divided elements is connected to the feed-back control circuit of the three pulse motors which can make fine rotation adjustment around the center to the plate holder (9) and fine sliding adjustment in X and Y axes directions independently.

To be more specific, the receiver element (21) is connected to the pulse motor for fine rotation, and the receiver element (211) is connected to the pulse motor for fine slide in X axis direction and also to the pulse motor for fine slide in Y axis direction respectively through the feed-back control circuit.

Since the feed-back control device is a known element in the art and is not directly related to the requirements of this invention, no further description is given here.

In this embodiment, the receiver element is extended to the side through a mirror and is placed not on the sensitized material surface itself but on a surface which is optically equivalent thereto. The same function can be realized, however, if the receiver element is placed on the sensitized material surface itself.

Numeral (22) designates a pair of register marks. The enlarged projection image of the marks is detected by the positioning sensors (17)(171). An example of such a mark is a cross mark. The mark's projection is placed at a fixed position on the center line of the film outside the effective image area and symmetrically to the center of the image of the microfilm (14).

In the following paragraphs, descriptions are given on the operation of the apparatus of this invention in relation to the motion of the main body incorporating the apparatus and referring to FIG. 3 to FIG. 6 in addition.

A standard register mark to control the position and the size of the image of the original microfilm (14) is formed on the register gauge, and the gauge is placed on the plate holder (9) so as the center is aligned to the light axis. By adjusting the exposure head (5) up and down to control the position of the projection lense (11), the enlarged image of the register mark on the said gauge is projected on the receiver elements (21)(211). The positions of the sensors (17)(171) are adjusted so as the enlarged projection of the said register mark in cross form is fitted to the boundary line between the divided receiving surfaces, I and II, of the receiver element (21) and also to the boundary lines of the divided receiving surfaces, I to IV, of the receiver element (211), and also so as the electrically independent output signals from I and II receiver elements, and the output signals from receiver elements I to IV are balanced each other, then the sensors (17)(171) are fixed at the adjusted positions.

After that, the microfilm (14) is unreeled to draw out the image of the desired frame approximately to the center of the plate holder (9). Then the register mark (22) projected on a fixed point outside the effective image area of the said image is enlarged on the respective detection sensors (17)(171). The effective image area (B) in the center of the shade plate (4) is masked at this time to prevent exposure of the sensitized material (2). The enlarged projection of the register mark (22) is reflected by the half-mirror at the outside of the sensors (17)(171) and further by the inside half-mirror (19) to be focused on the pint glasses (20)(201).

If the projected image of the register mark (22) is deviated substantially from the datum line on the pint glasses (20)(201) at this time, the projected and enlarged image of the register mark (22) must be approached to the said datum line by moving the microfilm (14) slightly while watching the pint glass (20) or (201).

Figures 5, 6:
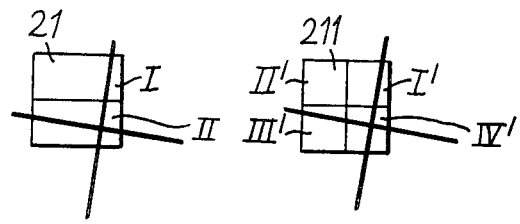

By this operation, the pattern of the enlarged and projected image of the register mark such as shown in FIG. 3 to FIG. 6 is obtained on the receiver elements (21)(211) of the sensors (17)(171). The pattern is as shown in FIG. 3 and FIG. 4, if the setting of the microfilm image (14) is proper in the rotary direction. Otherwise, the pattern is generally as shown in FIG. 5 and FIG. 6.

If the register mark enlarged and projected on the receiver elements (21)(211) is as shown in FIG. 3 to FIG. 6, for example, the output signals from the respective parts of the receiver elements (21)(211) are not balanced and, therefore, the said feed-back circuit functions automatically to balance the respective parts of the elements and also moves the plate holder (9) slightly in X axis or Y axis direction. When necessary, the plate holder (9) is turned slightly to fit the enlarged projection of the register mark on the specific frame image of the microfilm (14) held by the holder (9) snugly to the boundary lines of the divided light receiving surfaces of the receiver elements (21)(211).

Very precise positioning for printing of the microfilm (14) is thus made since the enlarged projection of the register mark is detected by the receiver elements (21)(211), and the position of the microfilm is adjusted automatically by the detection signals.

Once the printing position of the microfilm (14) is fixed exactly, the mask over the effective image area (B) at the center of the shade plate (4) is removed, and the printing work of the microfilm image is made on the sensitized material (2) in the same manner as for the conventional method. To turn the direction of the image by a desired angle, to inverse it by 180° for example, the plate holder (9) is turned by 180° by the rotary driving pulse motor. Since the register mark (22) is projected symmetrically to the center of the image and on the center line of the microfilm (14), the printing position of the inversed image can be fixed precisely in the same manner as described above without being affected by the deflection error of the rotation center of the plate holder (9) unlike the conventional method.

As disclosed above, it is possible to eliminate the error caused by the inclination of the guide rails for the exposure head or by the deflection of the rotary center of the plate holder at the head unit, and also the trouble that the rough fitting error on the original plate is enlarged on the sensitized material proportionally to the magnification, because the positioning of the projected image by the method and the apparatus of the present invention is made by the register mark of the original microfilm.

The marked improvement in the positioning accuracy for plate printing is most effective for the fitting of disassembled color plates required for color plate making by an enlarged projection step-and-repeat machine, for example.

What is claimed is:

1. Positioning apparatus for a photographic enlarger including a film holder, means for adjustably supporting said film holder in a selected position with respect to a sensitized material surface, said apparatus usable with a film containing at least one frame and having two register marks located at selected positions adjacent opposite sides of said frame and outside the image area of said frame, said enlarger having means for projecting said frame and said register marks toward said surface, comprising:

at least two mirrors, each one positioned in the path of the projected image of one said mark, for diverting the projected image of said mark away from said surface;

at least two sensors, one associated with each mirror, each comprising a receiver element having at least two electrically independent sections arranged symmetrically, and arranged to receive the respective diverted image of a register mark;

means for mounting said sensors at the optical equivalent of the focal plane of the projected image of said register mark on said sensitized material surface when said film is in a position to project the image of said frame onto a desired frame location on said surface;

means associated with said sensors for developing signals representative of the position of said projected register marks on said sensors and therefore of the position and orientation, relative to said sensitized material surface, of said enlarged projected image of said register marks; and means for adjusting the position and orientation of said holder comprising a feedback circuit connected to the sensors and adapted to activate at least one pulse motor for causing movement of the film holder rotationally about its center and rectilinearly in two perpendicular directions in the plane of the holder in response to said signals from said sensors to move said projected image to said desired frame location.

* * * * *